(12) United States Patent
Chae et al.

(10) Patent No.: US 8,074,138 B2
(45) Date of Patent: Dec. 6, 2011

(54) DECODING APPARATUS AND METHOD THEREOF

(75) Inventors: Su-Chang Chae, Daejeon (KR); Youn-Ok Park, Daejeon (KR); Jun-Woo Kim, Daejeon (KR)

(73) Assignees: Samsung Electronics Co., Ltd., Suwon-si (KR); Electronics and Telecommunications Research Institute, Daejeon (KR); KT Corporation, Seongnam (KR); SK Telecom Co., Ltd., Seoul (KR); KTFreetel Co., Ltd., Seoul (KR); Hanaro Telecom, Inc., Seoul (KR)

( * ) Notice: Subject to any disclaimer, the term of this patent is extended or adjusted under 35 U.S.C. 154(b) by 1203 days.

(21) Appl. No.: 11/722,041

(22) PCT Filed: Nov. 28, 2005

(86) PCT No.: PCT/KR2005/004019
§ 371 (c)(1),
(2), (4) Date: Jun. 18, 2007

(87) PCT Pub. No.: WO2006/068371
PCT Pub. Date: Jun. 29, 2006

(65) Prior Publication Data
US 2008/0209298 A1    Aug. 28, 2008

(30) Foreign Application Priority Data

Dec. 21, 2004 (KR) .................. 10-2004-0109424
Jun. 9, 2005 (KR) .................. 10-2005-0049216

(51) Int. Cl.
*H04L 1/18* (2006.01)
*G08C 25/02* (2006.01)

(52) U.S. Cl. ........ 714/748; 714/750; 714/751; 714/749; 714/755; 714/786; 714/762; 714/788

(58) Field of Classification Search .................. 714/755, 714/786, 788, 762, 748–751
See application file for complete search history.

(56) References Cited

U.S. PATENT DOCUMENTS

| 6,697,988 B2 | 2/2004 | Orfali |
| 2003/0235149 A1* | 12/2003 | Chan et al. ............ 370/206 |
| 2006/0245384 A1* | 11/2006 | Talukdar et al. ............ 370/310 |

FOREIGN PATENT DOCUMENTS

| EP | 1 246 385 A2 | 10/2002 |
| EP | 1 276 267 A2 | 1/2003 |
| EP | 1 337 066 A1 | 8/2003 |

OTHER PUBLICATIONS

"Rate Compatible Punctured Turbo-Coded Hybrid ARQ for OFDM in a Frequency Selective Fading Channel"—Deepshikha Garg, et al., pp. 2725-2729, IEEE, 2003.

* cited by examiner

Primary Examiner — Guy Lamarre
(74) Attorney, Agent, or Firm — Jefferson IP Law, LLP

(57) ABSTRACT

In a decoding apparatus in a portable Internet terminal, a channel encoded symbol received from a transmitter is decoded by one of a chase-combining scheme and a code-combining scheme selected based on an ID value of the subpacket indicating a start position of the symbol. In this case, the chase-combining scheme is partly used for the encoded symbol of the information bit. With such a mode, decoding can be performed at a low code rate.

15 Claims, 6 Drawing Sheets

[Fig. 1]
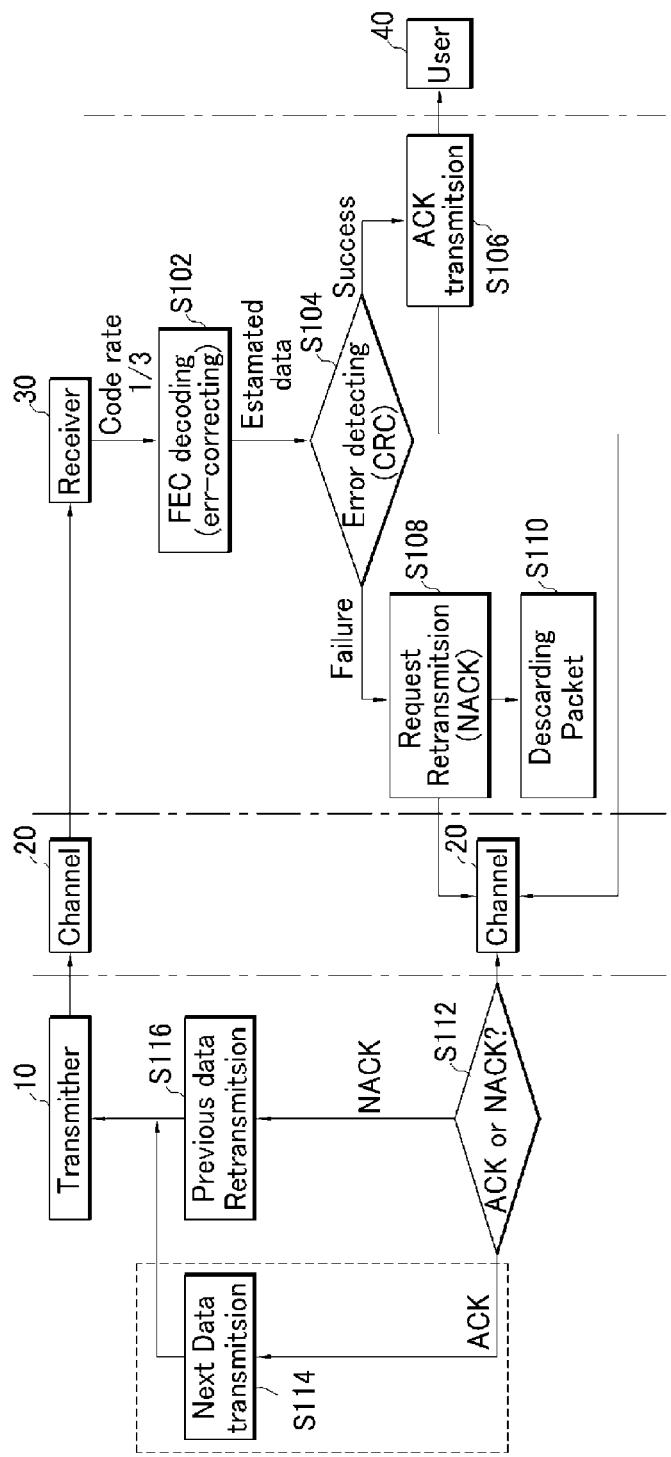

[Fig. 2]
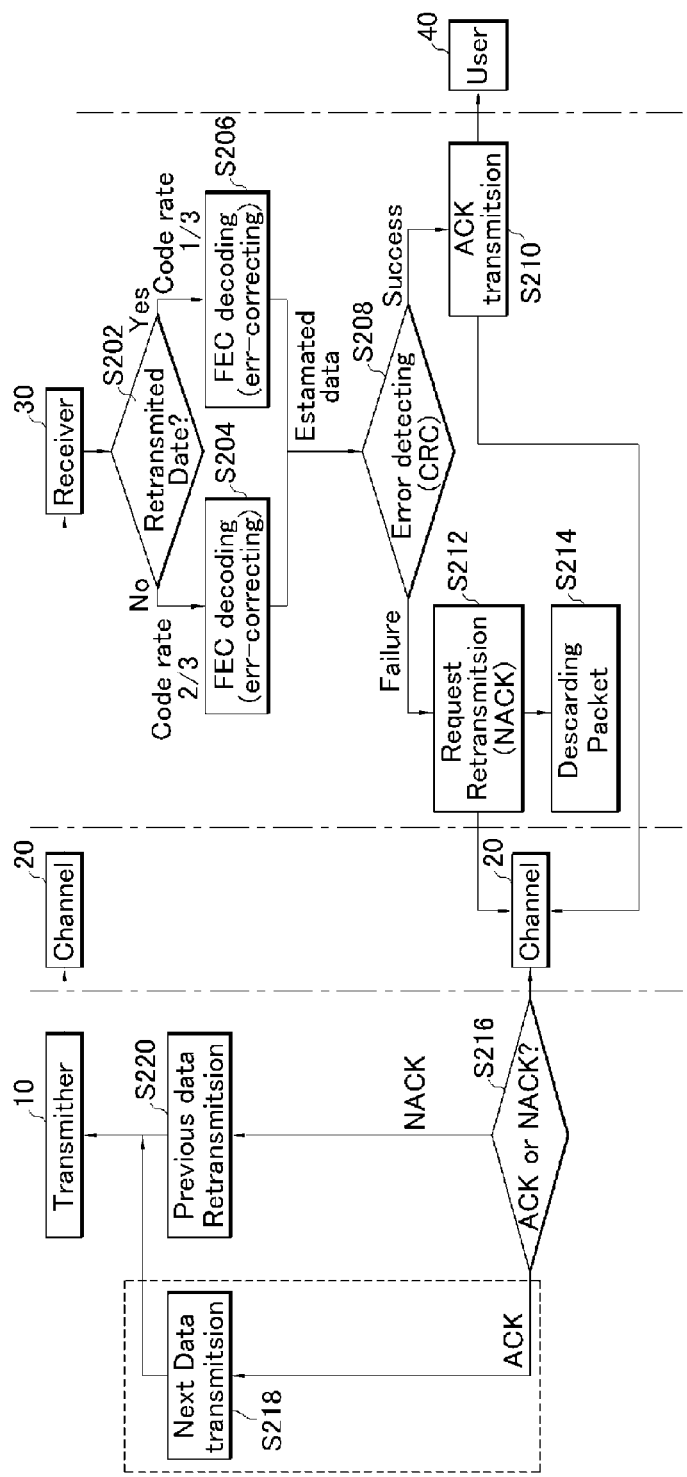

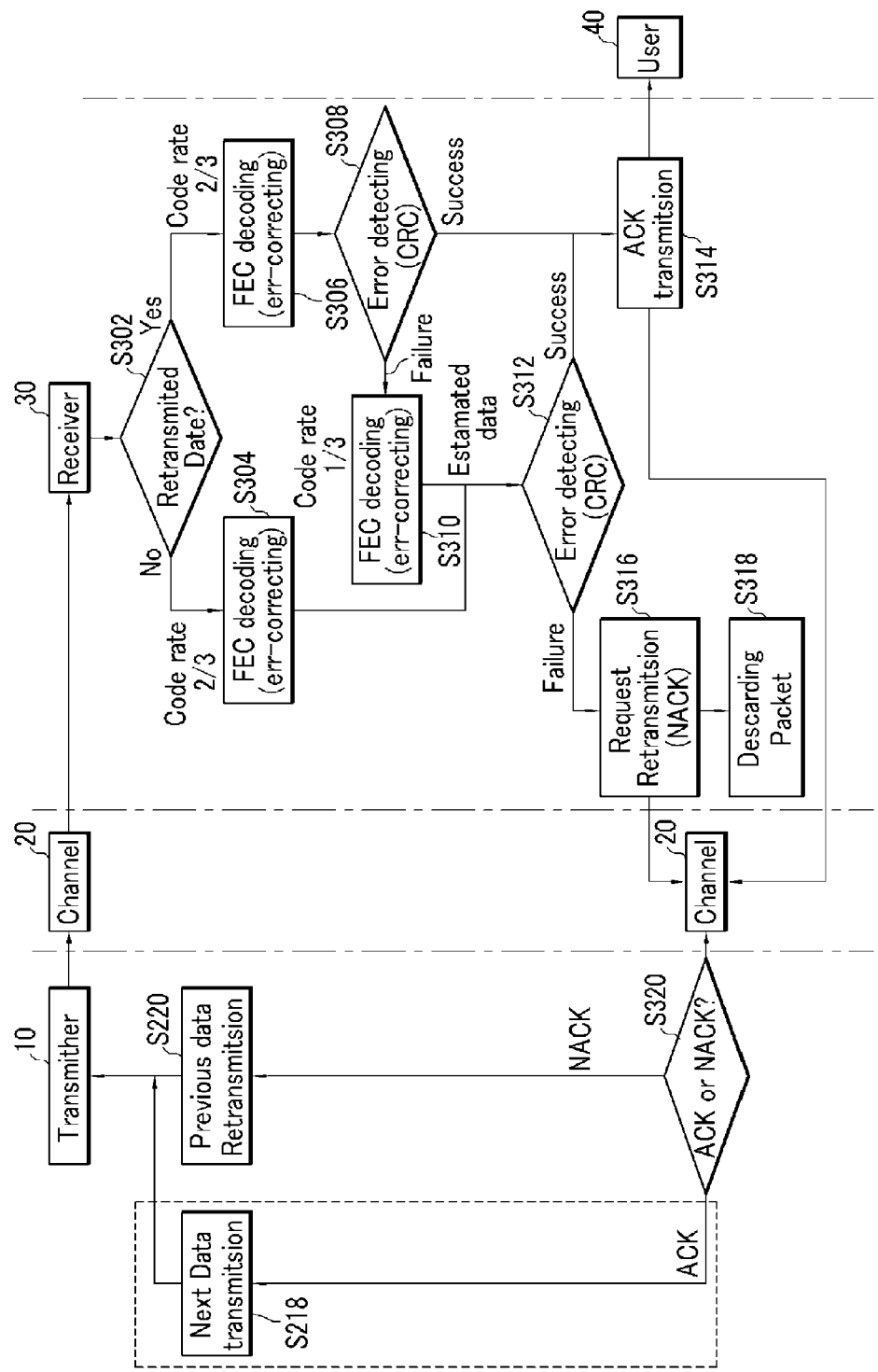
[Fig. 3]

[Fig. 4]
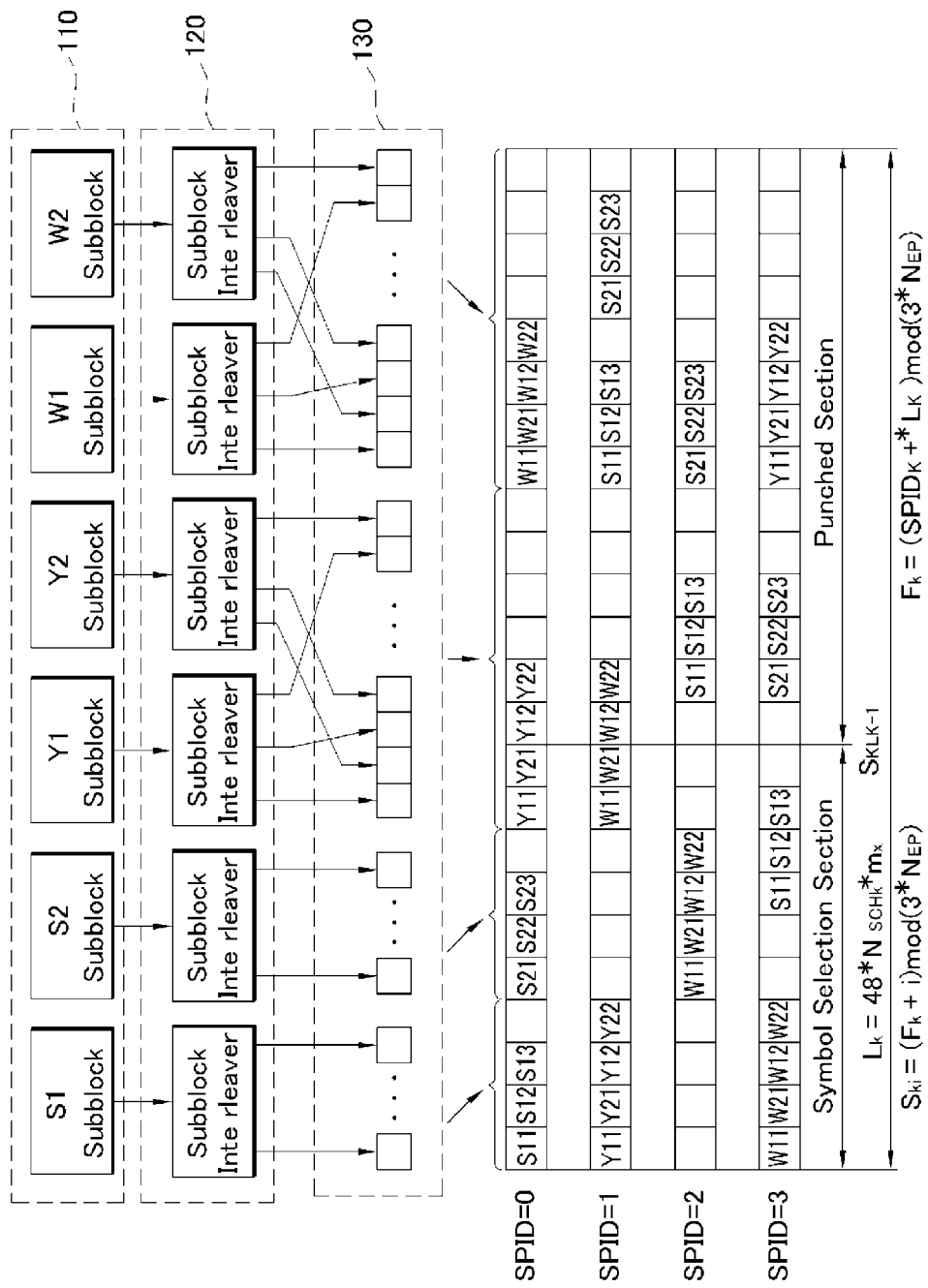

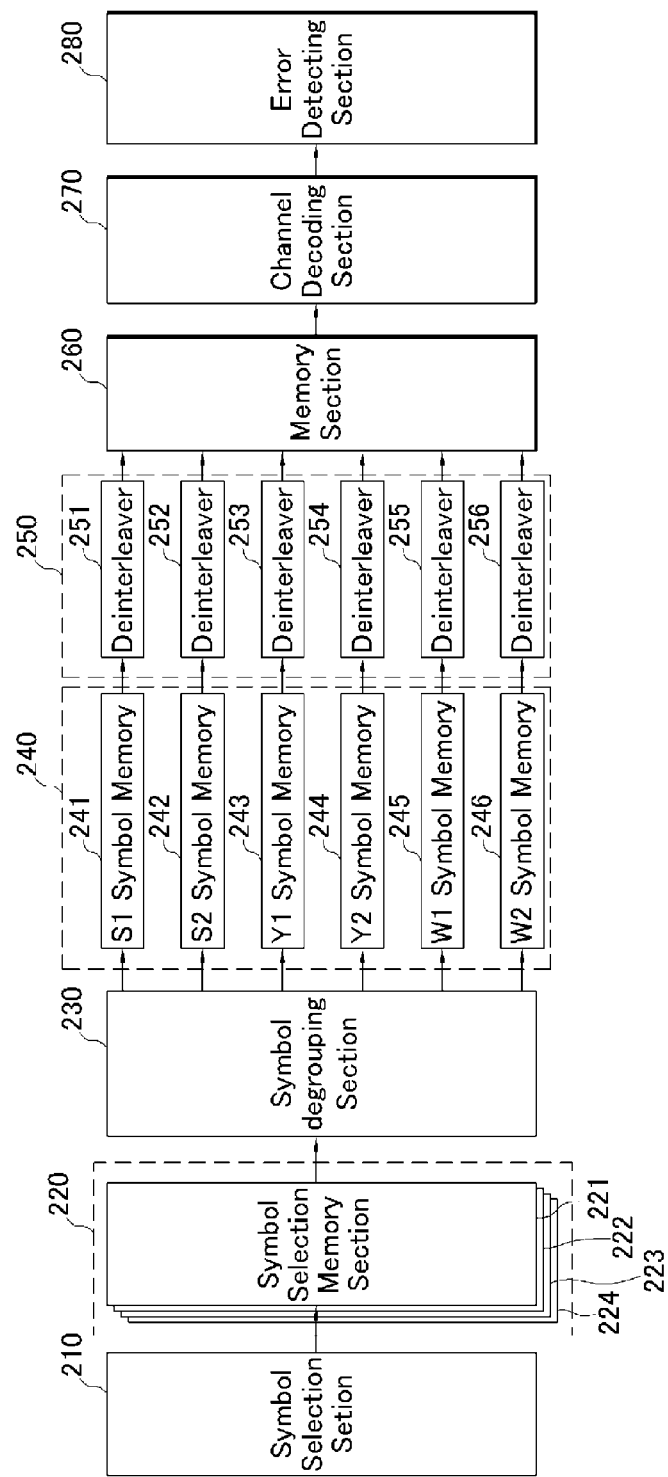
[Fig. 5]

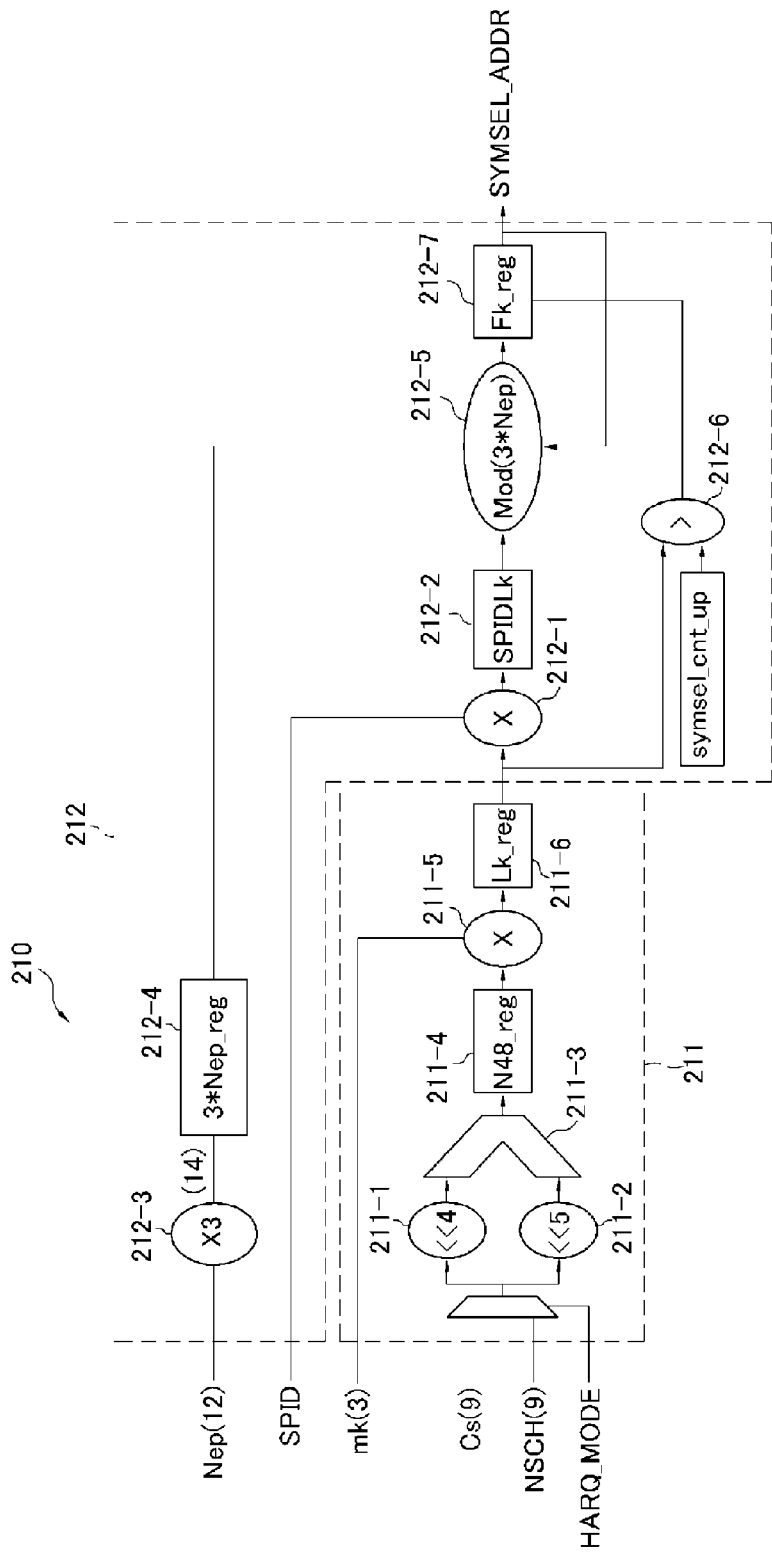
[Fig. 6]

DECODING APPARATUS AND METHOD THEREOF

TECHNICAL FIELD

The present invention relates a decoding apparatus used in a portable Internet mobile system and a method thereof.

BACKGROUND ART

Error controlling algorithms may be largely classified into two types: an automatic repeat request (ARQ) method and a forward error correction (FEC) method.

The ARQ is accomplished by a data link protocol of an OSI model and the FEC is accomplished by a physical layer. In the ARQ, the terminal has an error-detecting function for detecting errors in a message to request a retransmission when a transmission line is a half-duplex or a full-duplex line. In the FEC, the terminal has an error-correcting function for detecting errors in a message to correct the errors without requesting a retransmission. The ARQ has been widely used in data communication networks since it has a more simple structure and a higher reliability of data than the FEC. However, as the bit error rate of the channel is increased, the throughput of information is rapidly decreased in the ARQ. Meanwhile, in the FEC, the throughput of information is preserved at a predetermined level regardless of the bit error rate of the channel, but high reliability cannot be easily achieved.

In order to compensate for these drawbacks, a hybrid ARQ scheme (hereinafter, called HARQ) combining the ARQ and the FEC has been introduced. The HARQ scheme can have throughput of information similar to that of the FEC and reliability similar to that of the ARQ. In the HARQ, error-detecting and retransmission are requested after predetermined error-correction has been attempted by the FEC. Accordingly, since the conventional ARQ and FEC are combined, the HARQ may have a higher reliability and a lower error rate than the ARQ or FEC.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a decoding apparatus and a method thereof having advantages of high reliability and a lower error rate by selectively using HARQ TYPE-I, HARQ TYPE-II, and HARQ TYPE-III schemes having different performances according to the channel environment and the different codes used in a portable Internet terminal.

Technical Solution

An exemplary decoding apparatus for decoding grouped and interleaved packets received from a transmitter in a portable Internet terminal according to an embodiment of the present invention includes a symbol selection section for generating a plurality of subpackets having different symbol orders for the same packet to be retransmitted and selectively outputting symbols of the length to be transmitted in the generated subpacket, a channel decoding section for decoding the outputted symbol by one of a chase-combining scheme and a code-combining scheme selected based on the ID value of the subpacket indicating a start position of the symbol, and an error detecting section for checking errors of the packet estimated by decoding.

An exemplary decoding method for decoding grouped and interleaved packets received from a transmitter in a portable Internet terminal according to an embodiment of the present invention includes generating a plurality of subpackets having different symbol orders for the same packet to be retransmitted, selecting symbols corresponding to the length to be transmitted in the generated subpacket, decoding the outputted symbol by one of a chase-combining scheme and a code-combining scheme selected based on the ID value of the subpacket indicating a start position of the symbol, detecting an error of the packet estimated by decoding, and requesting a retransmission based on the error-detecting result.

BRIEF DESCRIPTION OF THE DRAWINGS

FIG. 1 is a flowchart for illustrating a HARQ TYPE-I scheme according to an exemplary embodiment of the present invention.

FIG. 2 is a flowchart for illustrating a HARQ TYPE-II scheme according to an exemplary embodiment of the present invention.

FIG. 3 is a flowchart for illustrating a HARQ TYPE-III scheme according to an exemplary embodiment of the present invention.

FIG. 4 is a flowchart for illustrating a part of a transmitter according to an exemplary embodiment of the present invention.

FIG. 5 is a flowchart for illustrating a decoding apparatus of a portable Internet terminal according to an exemplary embodiment of the present invention.

FIG. 6 is a flowchart for realizing a symbol selector shown in FIG. 5 as hardware.

BEST MODE FOR CARRYING OUT THE INVENTION

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A hybrid retransmission apparatus used in a portable internet terminal and a method thereof according to an exemplary embodiment of the present invention will be described in detail with reference to the accompanying drawings. In this embodiment, decoding is accomplished at a terminal of a high speed portable Internet (HPI) system.

First, HARQ TYPE-I, HARQ TYPE-II, and HARQ TYPE-III schemes of a HARQ scheme according to an exemplary embodiment of the present invention will be described with reference to FIG. 1 to FIG. 3.

FIG. 1 is a flowchart for illustrating a HARQ TYPE-I scheme according to an exemplary embodiment of the present invention.

As shown in FIG. 1, a transmitter 10 encodes data to be transmitted using an error-detecting code of a high code rate and then using an error-correcting code. The transmitter 10 temporally stores the encoded data at a buffer and transmits the stored data through a channel 20 to a receiver 30.

When the receiver 30 receives the signal passed through the channel 20, the receiver 30 transmits the signal in the form of Gaussian noise or a fading variable through a demodulator to a decoder. The decoder performs FEC decoding for the data (S102). When the FEC decoding estimates predetermined data, the estimated data are again CRC decoded to be error-checked (S104). When an error is not detected, an ACK message is transmitted to the transmitter 10 and a user 40, the ACK message notifies that data are successfully received (S106). When an error is detected, a NACK message is transmitted to the transmitter 10, requesting that data be retransmitted (S108). In this case, the previously received data are discarded (S110). The transmitter 10 determines the signal received through the channel 20 from the receiver 30. When the signal is the ACK message, the transmitter 10 transmits next data to the receiver 30 (S114). When the signal is the NACK message, the transmitter 10 retransmits the previous data (S116). The receiver 30 encodes the previous data again to detect errors. When the errors are detected, the above processes are repeated.

Meanwhile, in a chase-combining scheme, which is an alternative embodiment to the HARQ TYPE-I, the NACK message is requested for the transmitter 10, and the previously received data are not discarded but is recombined with the retransmitted data.

As such, the HARQ TYPE-I requires both of the error-correcting code and the error-detecting code. That is, the error-detecting code such as a cyclic redundancy check (CRC) is required. When the error-correcting code is used, overhead load is increased at both initial transmission and retransmission. Accordingly, the HARQ TYPE-I scheme has lower transmission efficiency in a good channel environment than the ARQ scheme which has no error-correcting code. As the channel environment deteriorates, the HARQ TYPE-I scheme has a higher transmission efficiency than ARQ, due to the error-correcting capability of the channel code.

In order to compensate for a drawback of such a HARQ TYPE-I scheme and reduce the overhead load of the channel code on data transmission, a HARQ TYPE-II scheme has been used. The HARQ TYPE-II scheme is a alternative embodiment of the ARQ scheme, called a full incremental redundancy (Full IR) scheme wherein redundancy for correcting errors is appropriately varied according to the request of the receiver 30.

FIG. 2 is a flowchart illustrating a HARQ TYPE-II scheme according to an exemplary embodiment of the present invention. In FIG. 2, it is assumed that an encoder with a code rate of 1/3 is used as a FEC code.

As shown in FIG. 2, data are encoded at the code rate of 1/3 to generate three encoded bits by one data bit. In this case, only one of the three encoded bits is transmitted through the channel. As a result, a code of a code rate of 2/3 may be basically generated.

The receiver 30 determines whether the data received through the channel 20 is the retransmitted data (S202). When the data are determined to be initial data, the data are FEC-decoded to be estimated with the code rate of 2/3 (S204). The estimated data are CRC-decoded and check errors (S208). When the error is not detected, the ACK message is transmitted to the user 40 (S210) and through the channel 20 to the transmitter 10 to perform the next process (S216). In this case, the transmitter 10 transmits the next data to the receiver 30 (S218). When the error is detected at S208, the NACK message is requested for the transmitter 10 (S212) and the initial packet is discarded (S214). Meanwhile, when the receiver 30 receives the retransmitted data that is differently encoded bits with the initially received bit from the transmitter 10, the retransmitted data are combined with the initially received data to be FEC-decoded into a code of the code rate of 1/3 (S206). The estimated data are again CRC-decoded to be error-checked S208. When errors are detected, the above processes are repeated.

In such a HARQ TYPE-II, only the increased redundancy is always retransmitted. Also, an amount of the redundancy can be properly controlled according to the channel environment so that the retransmission is more efficiently performed. However, while the transmitter 10 transmits the one encoded bit of the code rate of 1/3 to the receiver 30, the differently encoded data of the code rate of 2/3, that is, the rest of the encoded bits which is not transmitted must be stored in the buffer. Also, the receiver must store and control the received encoded bits so as to be combined with the error packet after it requests the NACK message. Accordingly, the HARQ TYPE-II scheme is very complicated.

Also, the redundancy cannot be decoded by itself. Accordingly, the decoder can be decoded depending on the initially transmitted data along with the retransmitted redundancy. In order to compensate for a drawback of such a HARQ TYPE-II scheme, a HARQ TYPE-III scheme has been used. The HARQ TYPE-III scheme has more enhanced performance in that the retransmitted information can be decoded by itself when the initially transmitted data becomes lost, and is called a partial incremental redundancy (Partial IR) scheme.

FIG. 3 is a flowchart for illustrating a HARQ TYPE-III scheme according to an exemplary embodiment of the present invention.

As shown in FIG. 3, the transmitter 10 sets a code rate of data appropriate for a channel environment and transmits the data through the channel 20 to the receiver 30. The receiver 30 determines whether the received data are the retransmitted data (S302) in the same manner as in FIG. 2. When the received data are the initially transmitted data, the data are FEC-decoded and estimated into a code rate of 2/3 (S304). The estimated data are again CRC-decoded and the estimated data are error-checked (S312). When an error is not detected, an ACK message is transmitted to the user (S314) and through the channel 20 to the transmitter 10 such that the next process is performed (S320, S322). In this case, the transmitter 10 transmits the next data to the receiver 30.

Meanwhile, when the error is detected at S312, a NACK message is transmitted to the transmitter 10 (S316) and the error-detected data are not discarded and are stored (S318). In this case, the transmitter retransmits the previous data to the receiver 30 (S320, S324). That is, the initially transmitted bit is not transmitted, but the rest of the encoded bits are transmitted to the receiver 30 so that the rest of the encoded bits are combined with the previously received information and are error-corrected into the code rate of 1/3.

Meanwhile, when the received data are the retransmitted data at S302, the retransmitted redundancy is FEC-decoded with the code rate of 2/3 differently from FIG. 2 (S306). The FEC-decoded redundancy is CRC-decoded again and are error-checked (S308). In this case, when an error is not detected, the ACK message is transmitted to the user (S314), and when an error is detected, the data are combined with the initially transmitted data to be FEC-decoded into the low code rate of 1/3 (S310). The estimated data are again CRC-decoded and are error-checked (S312). The above processes are repeated.

As such, in order to realize the HARQ TYPE-III scheme, the retransmitted redundancy must have a self-decodable characteristic, for example, be a complementary punctured convolutional (CPC) code in a system based on a convolutional code.

The CPC code is punched such that the respective retransmitted codes have the same error-correcting capacity. The respective punched codes are combined to express the original characteristics as before being punched.

Accordingly, in the HARQ TYPE-III, the information bit (e.g., systematic bits at the turbo code) must be included along with the redundancy. When the turbo code is used as the FEC, the HARQ TYPE-III may be most efficiently.

Meanwhile, a chase-combining scheme as an alternative scheme to HARQ TYPE-I does not discard the erroneous data but rather stores the same to be combined with the retransmitted data. On this point, the chase-combining scheme may be the same as one case of the HARQ TYPE-III scheme in which the same redundancy is transmitted or one redundancy is transmitted.

Generally, in the chase-combining scheme, the respective packet provides a weight value for L number of packets using the noise dispersion of the respective packets when combined with code, and accumulates the weight value. The accumulated value is considered as a newly received packet and is decoded.

When the retransmission recovery is small, a minimum free distance of retransmitted combined code is similar to the least upper bound value of the minimum free distance to be obtained at the specified code rate. As the retransmission recovery is increased, the difference is increased between the two minimum free distances. Accordingly, when the retransmission recovery is small, there is no difference in performance between the chase-combining scheme and the Full IR scheme using the optimized code at the respective code rates. But when the retransmission recovery is increased due to the deteriorated channel environment, the Full IR scheme is superior to the combining scheme in view of performance gain.

The above-described HARQ TYPE-I, HARQ TYPE-II, HARQ TYPE-III, and chase-combining schemes are selectively used according to the types of code and the channel environment. According to an exemplary embodiment of the present invention, a decoding apparatus of a portable Internet terminal and a method thereof for selectively using the HARQ schemes is provided.

A transmitter for efficiently applying the HARQ will be described with reference to FIG. 4.

FIG. 4 is a flowchart for illustrating a part of a transmitter according to an exemplary embodiment of the present invention. In FIG. 4, an output process of a channel encoder before transmitting to a receiver is illustrated.

As shown in FIG. 4, the transmitter includes a plurality of subblocks 110, a plurality of subblock interleavers 120 and a symbol grouping section 130. The sixth subblocks 110 are generated from the channel encoder, the corresponding subblock interleavers 120 interleave the respective subblocks 110, and the symbol grouping portion 130 groups the interleaved subblocks.

According to the exemplary embodiment of the present invention, four types of different symbol sequences are generated for the grouped whole symbol according to subpacket identification (SPID). The respective symbol sequences include a symbol selection section and a puncturing section. That is, only the symbol selection section ($L_K$) is used for the retransmission packet among the generated symbol sequence. Accordingly, the symbols after the symbol selection section ($L_K$) are naturally punctured. Extremely various code rates may be realized in such a manner. In this case, showing four types of different symbol sequences, a start point for selecting a symbol may be varied among all symbol blocks according to the SPID value. That is, when the SPID is given as '0', S1, S2, Y1, Y2, W1, and W2 symbols are sequentially selected and the symbol selection section is determined by $L_K$ shown in Equation 1.

When the SPID is not given as '0', the start point for selecting a symbol is varied as shown in Equation 2 and Equation 3, and another subpacket is generated according to a length of the $L_K$. The channel encoder retransmits the data using such subpackets and the channel decoder decodes the data using retransmitted subpackets and SPID values.

$$L_k = 48 * N_{SCHk} * m_k \quad \text{[Equation 1]}$$

In Equation 1, when the HARQ scheme is used, k is given as a subpacket index and $m_k$ is given as a modulation for a k-th subpacket modulation exponent. For example, when the QPSK modulation scheme is used, $m_k$ is given as 2, when the 16-QAM scheme is used, $m_k$ is given as 4, and when the 64-QAM scheme is used, $m_k$ is given as 6. In addition, $N_{SCHK}$ is given the number (1 to 480) of a subchannel allocated for the k-th subpacket.

$$S_{k,i} = (F_k + i) \bmod (3 * N_{EP}) \quad \text{[Equation 2]}$$

In Equation 2, $S_{k,i}$ expresses for the k-th subpacket wherein, i is from 0 to $L_K-1$, and $L_K$ and $F_K$ are given by the Equation 1 and Equation 3. $N_{EP}$ is encoded packet bit numbers ($N_{EP}$=48, 96, 144, 192, 288, 384, 480, 960, 1920, 2880, 3840, 4800) inputted to the channel encoder, and $SPID_K$ express the ID of the k-th subpacket. That is, the ID of the first subpacket can be represented by $SPID_{K-1}$=0. In this case, the respective encoded packets are initially transmitted and retransmitted for the respective subpacket unit by the HARQ operation.

$$F_k = (SPID_k * L_k) \bmod (3 * N_{EP}) \quad \text{[Equation 3]}$$

$N_{EP}$ and $L_K$ values are determined by the base station and are transmitted through the MAP message to the terminal station.

In this case, the SPID serves to notify where the symbol selection is started in the portable Internet terminal. $L_K$ symbols must be selected from a first symbol (SPID=0) at the initial transmission, and at the retransmission, and are selected from the closest symbol to the last transmitted symbol among the above four types of possible positions.

FIG. 5 is a flowchart illustrating a decoding apparatus of a portable Internet terminal according to an exemplary embodiment of the present invention.

As shown in FIG. 5, a decoder of the portable Internet terminal includes a symbol selection section 210, a symbol selection memory 220, a symbol de-grouping section 230, a symbol memory section 240, a de-interleaving section 250, a memory section 260, a channel decoding section 270, and an error detecting section 280.

The symbol selection section 210 generates a plurality of different subpackets for the same packet to be retransmitted and outputs the packet length ($L_K$) of the subpacket selected to the transmit symbol of the subpacket. In this case, four different types of symbol sequences are generated according to the SPID values, and the packet length ($L_K$) of the symbol is selected in the same manner as in FIG. 4 and is outputted to the symbol selection memory selection 220. As above noted, since the start point for selecting a symbol is varied among the whole symbol period according to the SPID values, non-punched redundancy bits can be retransmitted with various code rates and packet lengths and without a punched pattern.

The symbol selection memory section 220 includes a plurality of memories 221, 222, 223, and 224, and it stores a symbol at the memory respectively allocated for the same packet and stores a symbol at the memory in accordance with an ARQ channel identifier (ACID) for the different packet, where the ACID serves to classify a channel. In this case, the ACID is used to classify the four types (to the maximum) of encoded packets transmitted from one terminal. When the four types of the encoded packets are classified, the numbers 0 to 3 are assigned. When the same NACK message is transmitted and retransmitted in the current frame, it is difficult for it to arrive at the channel decoding section 270. Due to a calculation delay of an upper layer, the retransmitted packet is delayed by 1 to 2 frames so as to arrive at the channel decoding section 270. In this case, a memory for storing the selected symbol is multiplexed so as to multiplex a channel according to the delayed frame number channel, and in FIG. 5, since the delay of 3 frames is expected, four memories are shown.

The symbol de-grouping portion 230 divides the grouped symbols by six symbols S1, S2, Y1, Y2, W1, and W2 in a reverse process to that of the symbol grouping process shown in FIG. 4.

The symbol memory section 240 includes an S1 symbol memory 241, S2 symbol memory 242, Y1 symbol memory 243, Y2 symbol memory 244, W1 symbol memory 245, and W2 symbol memory 246 to respectively store the six symbols divided by the symbol de-grouping portion 230.

The de-interleaving section 250 includes a plurality of deinterleavers 251 to 256 and deinterleaves the symbols outputted from the corresponding symbol memory in a reverse process to that of the interleaving process shown in FIG. 4.

The memory section 260 stores the de-interleaved symbols as the input memory of the channel decoding portion 270.

The channel decoding section 270 FEC-decodes the symbols outputted from the memory section 260. In this case, symbols selected according to the ID of the sub-packet ID are decoded by the chase-combining scheme or the code-combining scheme, and the decoded bit can be error-corrected by selectively using an LDPC (low density parity check) code and a CTC (convolutional turbo code) code as the channel code.

In more detail, the retransmission packet for the information bit (systematic bit) is decoded by the chase-combining scheme, and the retransmission packet for the redundancy bit is decoded by the code-combining scheme. The code-combining scheme performs combining of code words by Full IR or Partial IR as described above.

In the LDPC code, operation can be independently performed between the check node and bit node without transmitting the systematic bit for the respective packet. Accordingly, the LDPC may be efficiently used for the HARQ TYPE-II scheme.

The error detecting section 280 performs CRC-decoding of the estimated bit to be error-checked. In this case, when there is no error, the flag is given as '0' (ACK), and when there is an error, the flag is given as '1' (NACK). Generally, the error detecting section 280 uses CRC_16 of ITU-R standard.

FIG. 6 is a flowchart for realizing a symbol selector shown in FIG. 5 as hardware.

As shown in FIG. 6, the symbol selection section 210 includes a symbol length determining unit 211 and a symbol selector 212.

The symbol length determining unit 211 includes shift operators 211-1 and 211-2, an adder 211-3, a multiplier 211-5, and registers 211-4 and 210-6, and determines the length of the symbol selected in the subpacket based on Equation 1. In Equation 1, the circuit for multiplying by 48 expresses the 48 in forms of $2^n$, that is $(32 \, (2^5)+16 \, (2^4))$ and the shift operators 211-1 and 211-2 receive the number of the subchannels Nsch and CS according to the respective HARQ_MODEs and shift-operate the number of subchannels the corresponding $2^n$ times, that is, the shift operator 211-1 shift-operates the number of the subchannels 4 times and the shift operator 211-2 shift-operates the number of subchannels 5 times. Thereafter, the adder 211-3 adds the shift-operated values. The register 211-4 temporally stores the results values N48_reg and the multiplier 211-5 multiplies the stored values and the $m_k(3)$ values to be transmitted to the register 211-6. The register 211-6 stores the multiplied values Lk_reg. In this case, the circuit for multiplying 48 uses not a multiplier circuit but a shift operator, and thereby reduces an operation delay time.

The symbol selector 212 includes adders 212-1 and 212-3, registers 212-2, 212-4, and 212-7, a modular operator 212-5, and a comparator 212-6, and selects symbols corresponding to the symbol length determined in the subpacket based on Equation 3. The multiplier 212-1 multiplies the stored values Lk-reg of the register 211-6 and the SPID values and the register 212-2 stores the multiplied values SPIDLk. The multiplier 212-3 multiplies 3 with the values of $N_{EP}(12)$ and the register 212-4 stores the result values 3*Nep_reg. The modular operator 212-5 modular-operates the stored values SPIDLk of the register 212-2 and the register 212-7 stores the result values Fk-reg. The comparator 212-6 compares the count value symsel_cnt_up incremented by '1' with the stored values of the register 211-6 to generate enable signals to be outputted. When the enable signal is valid, '1' is updated. The register 212-7 selects a value provided after the update as the symbol selection address after the updating stops. The symbol selection address is identically generated when the packet is retransmitted and is used to store the respective symbols at the symbol selection memory section 220, wherein the respective symbols correspond to the retransmission packet received from the channel decoding section 270.

As such, the symbol selector 212 generates the addresses corresponding to the symbol length ($L_K$). In addition, a start address is not inconsecutively generated for the respective packet but is consecutively generated for the entirety of the symbol length since it is repeated and circulated according to SPID values. That is, the packet for the retransmitted redundancy bit is generated from the next address corresponding to the same symbol data length and the symbols are transmitted by desired packet length. Accordingly, the channel decoding section 270 consecutively stores new packets using the addresses consecutively generated from the symbol selection section 210, when a packet for which the SPID is not '0' is reached. When the retransmitted packets for redundancy bits are decoded, the low code rate can be used.

INDUSTRIAL APPLICABILITY

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, these two modes can be used considering merits and drawbacks of the conventional HARQ TYPE-II scheme and HARQ TYPE-III scheme and when the systematic bits are an important turbo code and the received packet is the code symbol for the systematic bits, and a chase-combining scheme is partly used. Accordingly, the efficiency of the decoding can be increased. Various code rates can be realized without the specified pattern and a punched pattern can reduce the complexity in comparison with the code rate generating method.

In addition, when the SPID is the same as the ACID, in the symbol selection section, consecutive addresses for the retransmission packets are generated and combined with the code symbols to generate a new address, and symbols of the packet received from the new address are consecutively stored. That is, the code-combining scheme is accomplished. Thus, decoding can be performed at the low code rate.

Also, when the HARQ TYPE-III scheme is realized by using the LDPC decoder as the channel decoding scheme, the Partial IR scheme can be efficiently realized.

The invention claimed is:

1. A decoding apparatus for decoding grouped and interleaved packets received from a transmitter in a portable Internet terminal, comprising:
a symbol selection section for receiving a subpacket and selectively outputting symbols by a symbol length in the subpacket using an ID value of the subpacket indicating a start position of the symbols;
a channel decoding section for decoding the outputted symbols by one of a chase-combining scheme and a code-combining scheme selected based on the ID value of the subpackets indicating the start position of the symbols; and
an error detecting section for checking errors of the packets estimated by decoding,
wherein the symbol length is determined based on a number of subchannels allocated at the subpacket and a modulation exponent of the subpacket.

2. The decoding apparatus of claim 1, wherein the symbol selection section includes:
a symbol length determining unit for determining the symbol length in the subpacket by multiplying the number of subchannels allocated at the subpacket, the modulation exponent, and a specified number; and
a symbol selector for sequentially selecting symbols corresponding to the symbol length from the start position of the symbol in the subpacket.

3. The decoding apparatus of claim 2, wherein the symbol length determining unit includes:
a plurality of shift operators for expressing the specified number in the form of 2nand respectively shift-operating the number of the subchannels corresponding to the expression of 2 nform;
an adder for adding the result values respectively operated by the plurality of the shift operators; and
a first multiplier for multiplying the result value of the adder with the modulation exponent and outputting the number of symbols.

4. The decoding apparatus of claim 3, wherein the specified number is 48.

5. The decoding apparatus of claim 3, wherein the symbol selector generates addresses for the selected symbols based on the ID values of the subpacket, and consecutively generates the addresses for the same packet.

6. The decoding apparatus of claim 5, wherein a subpacket for the retransmitted redundancy bit is generated from the next address.

7. The decoding apparatus of claim 5, wherein the symbol selector includes a second multiplier for multiplying the ID value of the subpacket by the length of the symbol outputted from the first multiplier; and
a modular operator for modular-operating the output of the second multiplier by a specified value, and again modular-operating the modular operated value by the specified value to generate a new address for the selected symbol.

8. The decoding apparatus of claim 1, wherein the channel decoding section uses the chase-combining scheme for an information bit and uses the code-combining scheme for a redundancy bit.

9. The decoding apparatus of claim 8, further comprising:
a symbol selection memory section including a plurality of memories, for storing the symbols selected by the symbol selection section at the memory in accordance with an ARQ channel identifier (ACID) for dividing channels for different packets;
a symbol de-grouping section for de-grouping symbols outputted from the symbol selection memory section;
a symbol memory section having a plurality of memories, for storing the degrouped symbols; and
a deinterleaving section for rearranging the symbols outputted from the symbol memory section to be transmitted to the channel decoding section.

10. A decoding method for decoding packets received from a transmitter in a portable Internet system, comprising:
receiving a subpacket;
selectively outputting symbols by a symbol length determined based on a number of subchannels allocated at the subpacket and a modulation exponent of the subpacket in the subpacket using an ID value of the subpacket indicating a start position of the symbols;
decoding the outputted symbols by one of a chase-combining scheme and a code-combining scheme selected based on the ID value of the subpacket;
detecting an error of the packet estimated by decoding; and
requesting a retransmission based on the error-detecting result.

11. The decoding method of claim 10, wherein at decoding, a low density parity check (LDPC) code and a convolutional turbo code (CTC) are selectively used so as to correct an error.

12. The decoding method of claim 11, wherein a start position of the selected symbol is varied in the entire symbol length based on the ID value of the subpacket.

13. The decoding method of claim 10, wherein the number of the symbols corresponding to the packet length to be transmitted is determined by the following equation:

$$Lk=48*NSCHk*mk$$

wherein, k is given as a subpacket index, mk is given as a modulation exponent for the k-th subpacket, and NSCHK is given as a number of subchannels allocated for a k-th subpacket.

14. The decoding method of claim 10, wherein the chase-combining scheme is used based on the ID value of the subpacket when the selected symbol is an information bit.

15. The decoding method of claim 10, wherein the code-combining scheme is used based on the ID value of the subpacket when the selected symbol is a redundancy bit.

* * * * *